(12) United States Patent
Peterson et al.

(10) Patent No.: US 11,825,025 B2
(45) Date of Patent: Nov. 21, 2023

(54) PROMPT DETECTION BY DIVIDING WAVEFORM SNIPPETS INTO SMALLER SNIPPLET PORTIONS

(71) Applicant: Intrado Corporation, Omaha, NE (US)

(72) Inventors: Patrick Peterson, Cambridge, MA (US); Sarah Lynn Hagan, Allen, TX (US); Laura Jill Kleiman, Arlington, MA (US)

(73) Assignee: Intrado Corporation, Omaha, NE (US)

( * ) Notice: Subject to any disclaimer, the term of this patent is extended or adjusted under 35 U.S.C. 154(b) by 44 days.

(21) Appl. No.: 17/542,995

(22) Filed: Dec. 6, 2021

(65) Prior Publication Data

US 2023/0179713 A1 Jun. 8, 2023

(51) Int. Cl.
*H04M 3/537* (2006.01)
*H04M 3/436* (2006.01)
*H04M 3/487* (2006.01)

(52) U.S. Cl.
CPC ........... *H04M 3/537* (2013.01); *H04M 3/436* (2013.01); *H04M 3/487* (2013.01); *H04M 2203/301* (2013.01); *H04M 2203/305* (2013.01)

(58) Field of Classification Search
None
See application file for complete search history.

(56) References Cited

U.S. PATENT DOCUMENTS

| 2002/0077819 | A1  | 6/2002  | Girardo |
| 2011/0173185 | A1* | 7/2011  | Vogel ................... G06F 16/634 707/E17.014 |
| 2013/0266127 | A1  | 10/2013 | Schachter et al. |
| 2014/0195501 | A1* | 7/2014  | Vlack ................. H03M 7/3066 707/693 |

* cited by examiner

*Primary Examiner* — Hemant S Patel

(57) ABSTRACT

Prompt snippets (typically 800 ms long) that are used to detect voice prompts within a call waveform may be divided into smaller sniplet portions (approx. 100 ms) long. The presence of a prompt in a call waveform may be detected by detecting the sniplets and determining if a sufficient number of the sniplets of a snippet were detected in sequence and within allowable time constraints. The use of sniplets improves accuracy of prompt detection in call waveforms in lower quality transmissions.

17 Claims, 6 Drawing Sheets

PROMPT DETECTION BY DIVIDING WAVEFORM SNIPPETS INTO SMALLER SNIPPLET PORTIONS

CROSS-REFERENCE TO RELATED APPLICATION

This application is related to co-pending U.S. non-provisional patent application Docket No. PAT-356 entitled, "TIME TOLERANT PROMPT DETECTION" which were filed on the same day and each incorporated herein by reference in its entirety.

FIELD

This disclosure relates to systems and methods for providing call center reports.

BACKGROUND

Automatic monitoring of call center calls can be performed by analyzing waveforms recorded during a call. IVR prompts within the waveform have been, in the past, relatively easy to detect because a particular IVR prompt plays the same samples every time. The prompts are detected automatically and the sequence of the prompts can be analyzed to determine what action has occurred to be able to then create reports for how to improve a companies' IVR.

One prior art prompt detection system, called pdetect, implements a classical matched-filter receiver to detect any number, typically in the hundreds, of preselected prompt waveform short (~800 ms) "snippets" within a long call (typically minutes long). Those calls usually include a segment with interactions between callers to customer service and an Interactive Voice Response (IVR) system that plays pre-recorded prompts to users to elicit responses that help in identifying the caller and their reason for call and perhaps even handling the call automatically. Because the prompts are prerecorded and don't change, matched filtering can detect them reliably using short snippet samples of less than a second.

In years past, when digital circuits carried voice traffic as samples over T1 lines, the fidelity of samples in time and amplitude was very high and detection rates were above 98%. With the rise of much cheaper digital voice transport via packet-switched networks (e.g., VOIP, or Voice Over Internet Protocol) with coding of whole packets to reduce bit-rate, distortions of the digital sample stream such as missed samples or even missing packets, can be significant enough to reduce detection rates for simple matched filtering (pdetect) by as much as 50%.

Thus, what is required is an enhanced prompt detection system.

SUMMARY

The location of voice prompts within a call waveform is usually conducted by match filtering a snippet of the prompt (approx. 800 ms) to the call waveform. In an enhanced process that can account for transmission errors when detecting voice prompts on lower quality transmission lines, a snippet of a voice prompt may be divided into sniplets, typically 100 ms long. The sniplets can be individually detected. If a sufficient number of sniplets are detected within allowed time tolerances, then this subset of detected sniplets can indicate the presence of the snippet, and thus the associated voice prompt.

In one aspect of the disclosure, there is provided a method. The method may comprise processing a plurality of stored call waveform snippets to divide at least one stored call waveform snippet into a plurality of call waveform sniplets, storing the plurality of call waveform sniplets, processing a call waveform to detect a plurality of the stored call waveform sniplets within the call waveform, and processing the detected call sniplets to determine if the detected call sniplets collectively represent one or more of the stored call waveform snippets.

In one aspect of the disclosure, there is provided a system. The system may include at least one processer, at least one memory operatively associated with the at least one processor and at least one database. The at least one database stores call waveform snippets. The at least one processor is programmed to process a plurality of the stored call waveform snippets to divide at least one stored call waveform snippet into a plurality of call waveform sniplets, store the plurality of call waveform sniplets in the database, process a call waveform to detect a plurality of the stored call waveform sniplets within the call waveform, and process the detected call sniplets to determine if the detected call sniplets collectively represent one or more of the stored call waveform snippets.

In one aspect of the disclosure, there is provided a non-transitory computer readable medium comprising instructions, that when read by a processor, cause the processor to perform processing a plurality of stored call waveform snippets to divide at least one stored call waveform snippet into a plurality of call waveform sniplets, storing the plurality of call waveform sniplets, processing a call waveform to detect a plurality of the stored call waveform sniplets within the call waveform, and processing the detected call sniplets to determine if the detected call sniplets collectively represent one or more of the stored call waveform snippets.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
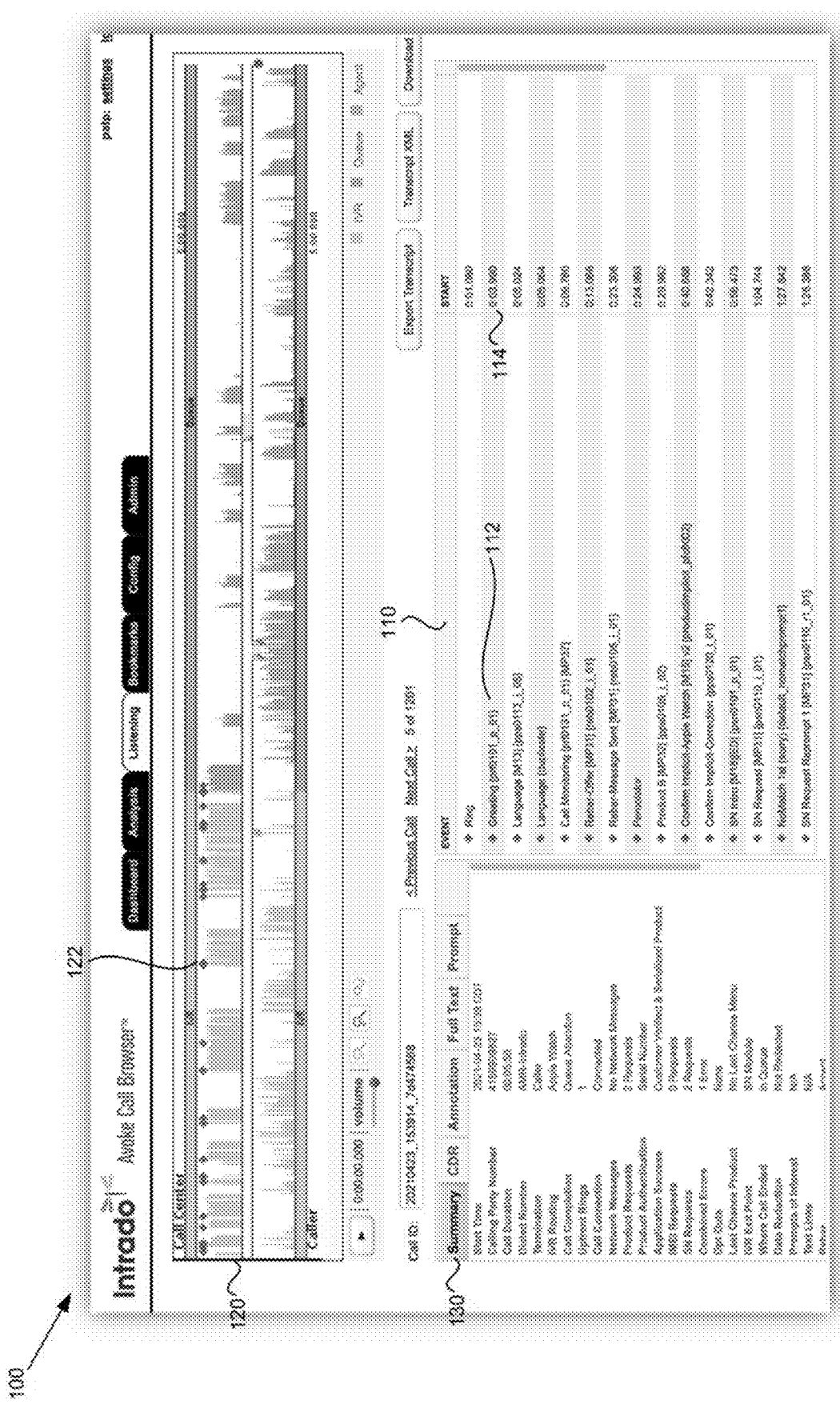
FIG. 1 shows an example of a call browser interface.

A call browser is a system that records Customer Service calls and uses signal processing technology to detect known audio prompts that are played to callers by an IVR. The sequence of detected prompts can be analyzed to automate a summary of call properties and to prepare automated reports. This enables the call center to identify issues in the IVR and improve customer service.

The prompt detection implements a classical matched-filter receiver to detect any number, typically in the hundreds, of preselected prompt waveform short (~800 ms) "snippets" within a long call (typically minutes long). Those calls usually include a segment with interactions between callers to customer service and an Interactive Voice Response (IVR) system that plays pre-recorded prompts to users to elicit responses that help in identifying the caller and their reason for a call and perhaps even handling the call automatically. Because the prompts are prerecorded and do not change, matched filtering can detect the IVR prompts reliably using short snippet samples of less than a second.

In years past, when digital circuits carried voice traffic as samples over T1 lines, the sample-by-sample correlation of a saved prompt sample (e.g., an 800-ms prompt "snippet") in time and amplitude was very high and detection rates were above 98%, thus providing a very reliable indicator that the prompt occurred and of its exact location within the call.

With the rise of much cheaper digital voice transport via packet-switched networks (e.g., VOIP, or Voice Over Internet Protocol) with coding of whole packets to reduce bit-rate, distortions of the digital sample stream such as missed samples or even missing packets, can be significant enough to reduce detection rates for simple matched filtering (pdetect) by as much as 50%. As will be described herein, a system that will be referred to as a time-tolerant detection (TTD)prompt detector can be used to restore the high prompt detection rates even in lower quality transmissions.

Time-tolerant detection may be considered a wrapper around the classic pdetect that adds some algorithm sophistication to compensate for any time differentials or sample issues that occur in a call, by splitting prompts into many smaller pieces that are less susceptible to time distortions when detected separately. The TTD process combines detection information from the smaller prompt pieces in a way that is tolerant of time errors and restores detection rates to a high 90% range.

The present methods recognize that the entire snippet does not need to be detected and matched. Instead, a confident indication of a snippet and thus a prompt can be produced by detecting a sufficient number of portions, or sniplets, of a snippet and applying timing and/or sequencing constraints to the detected sniplets. A set of sniplets that satisfy the constraints can indicate the presence of a greater snippet, and thus, the presence of a voice prompt.

In the detailed description of functionality below, the term "snippet" is used to describe the segment that has been cut from an IVR prompt and is configured for detection in pdetect. The use of snippets is known within conventional pdetect algorithms. A "sniplet" is a term for the TTD algorithm and is a short audio segment that consists of ⅛ (or, more generally, 1/Nth) of the full length "snippet".

The time-tolerant detection prompt detector splits a snippet into separate, consecutive "sniplets" and then runs pdetect (i.e., matched filtering) on a call using these sniplets. It combines the resulting information with some flexibility to determine whether the target snippet was most likely present in the original audio before the introduction of sample/audio issues.

In one embodiment, the time tolerant detection process requires a successful detection and correlation of a minimum number "count" of sniplets that form a snippet. The count may be an absolute number. In one embodiment, at least two sniplets must be detected and correlated. In one embodiment, at least three sniplets must be detected and correlated. In one embodiment, at least four sniplets must be detected and correlated. In one embodiment, at least six sniplets must be detected and correlated. Rather than requiring an absolute number of sniplets, the count may be relative to the number of sniplets that form the sniplet. Thus, in one embodiment count may represent at least a 25% detection of sniplets (e.g., count=2 if a snippet is divided into 8 sniplets, or count=3 if a snippet is divided into 12 sniplets). In one embodiment, count may represent at least a 30% detection of sniplets. In one embodiment, count may represent at least a 40% detection of sniplets. In one embodiment, count may represent at least a 50% detection of sniplets. In one embodiment, count may represent at least a 60% detection of sniplets.

FIG. 1 shows an example of a call browser. The call browser 100 provides a display for analyzing calls. To produce the display, the call browser 100 receives a call waveform and runs the pdetect algorithm to identify prompts within the call. The browser produces a list of events 110 including an event label 112 and a timestamp 114. The browser displays a waveform timeline 120. The events can be marked 122, e.g., using a diamond symbol, on the waveform. Selecting a diamond 122 may highlight that particular event in the list 110. The call data can be processed to reveal a range of metrics and parameters pertaining to the call. For example, FIG. 1 shows a call summary 130 for a single call including such parameters as call duration, how the call was completed, and IVR exit point. Individual call data can be analyzed to address specific issues of a caller. Multiple call data can be analyzed to determine inefficiencies in the call handling, specifically any issues with the IVR menus. Thus, it can be seen that accurate identification of events within a call is essential for proper call analysis. The present disclosure is directed to accurately determining events within a call, specifically, the timing of IVR prompts played to a caller. The specific metrics, parameters and call analysis conducted after the identification of the prompts within the call is not considered pertinent to the present disclosure.

Figure 2:
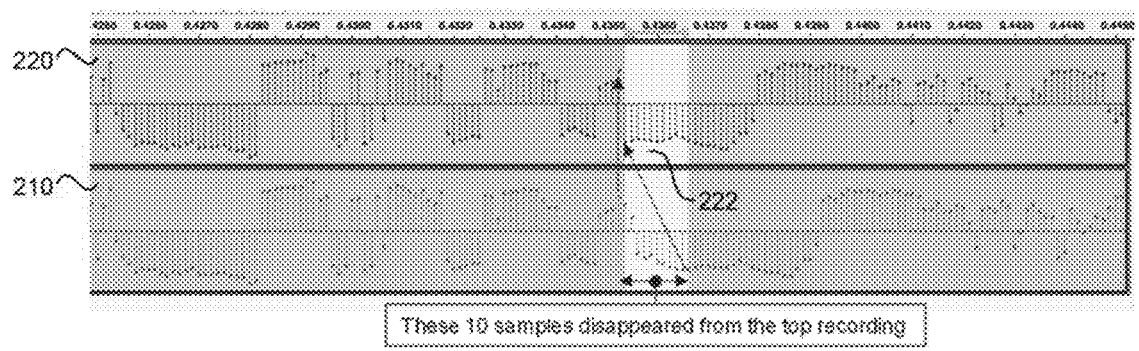
FIG. 2 shows a first example of waveform errors that can lead to prompt detection errors.
Figure 3:
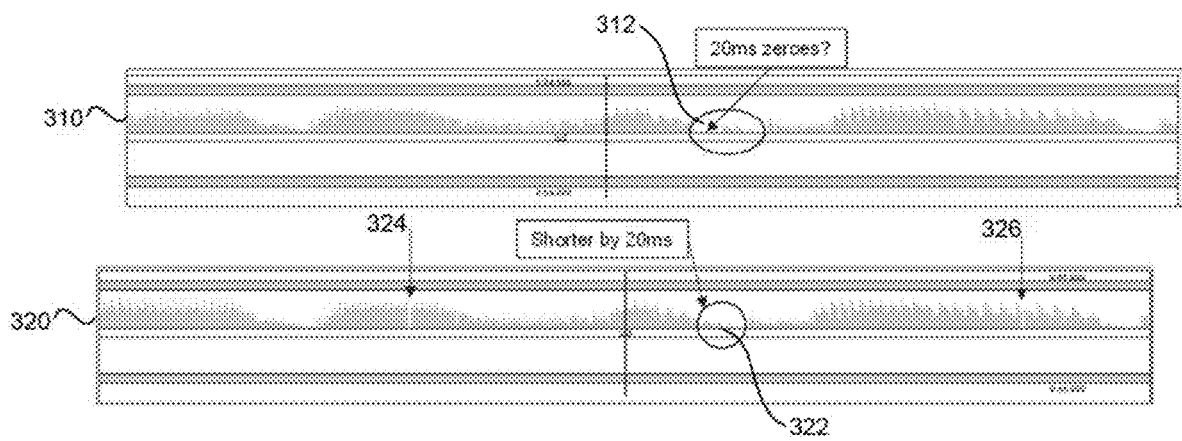
FIG. 3 shows a second example of waveform errors that can lead to prompt detection errors.

As discussed above, problems identifying prompts within the call waveforms can exist when the calls are conducted through cheaper, lower quality modes, such as VOIP. To illustrate the problem, FIG. 2 shows a comparison of two recordings 210, 220 of a short segment of the same prompt, one of which 210 has been selected by an analyst as the "clean" error-free reference version of the prompt, and one of which 220 illustrates the same section of the prompt from another call recording with errors. When the call recording 220 is compared to a prompt recording 210, it can be seen that ten samples 222 have been missed. In FIG. 3, a call waveform 310 has approximately 20 ms of zeroes 312 in the waveform. In another recording 320, the portion 322 has been dropped entirely with the recording 320 shortened by 20 ms, possibly due to packets being dropped. The waveform 320 shows other examples 324, 326 where sections have been dropped. These recording errors can cause the correlation of snippet and call samples to fall below the prompt detection threshold due to sample time shifts.

Figure 4:
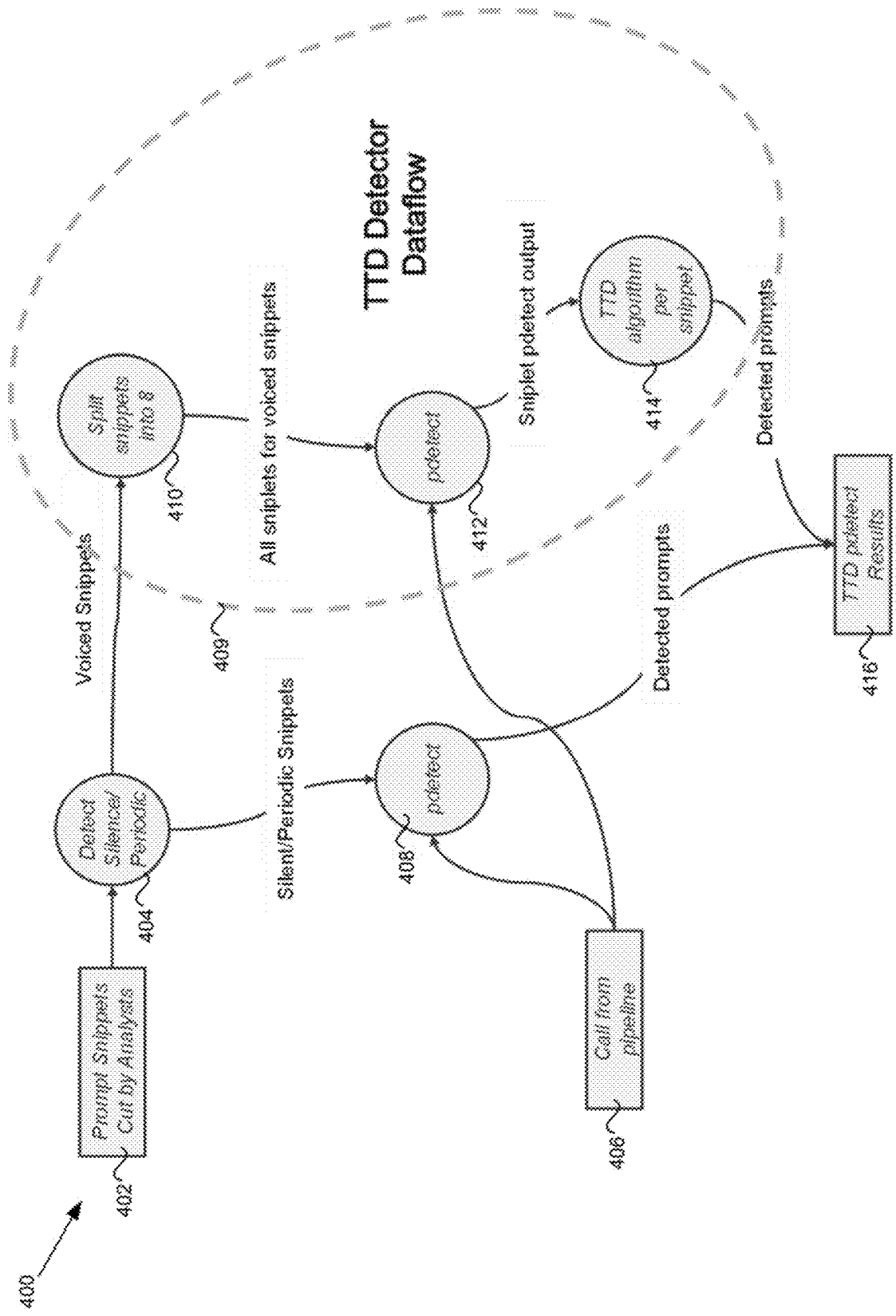
FIG. 4 shows a process flow for analyzing a call to determine prompts within the call.

FIG. 4 shows an example of a call processing system that can utilize a time-tolerant detection method. In the system 400, suitable snippets are cut from prompts by analysts and stored 402. The snippets are automatically processed 404 to determine if they meet special circumstances that would prevent the snippets being effectively broken further into sniplets. Snippets containing large portions of silence, e.g., 50%, or periodic snippets are not considered suitable for reasons that will be discussed further below. For these snippets, a call from the call pipeline 406 is processed using the known pdetect matched filtering process using the full snippet duration 408.

For the remaining snippets, which will typically, though not exclusively, be "voiced" snippets, each snippet target is split or subdivided into N equal length sniplets 410 and the sniplets are stored in a database to enable the sniplets to be used in the TTD process 409. In one embodiment, snippets are typically ~800 ms and dividing the snippet into eight (N=8) approximately equal portions has been found to be suitable. Thus, the sniplet length may be ~100 ms in one embodiment. However, the person skilled in the art will readily understand that different sniplet lengths and different values for N may be considered, giving rise to different sniplet lengths. Shorter sniplet lengths can give rise to more fault tolerance by dividing the snippet into more portions, but if the sniplet becomes too short, then accurate matched filtering becomes problematic. In one embodiment, the sniplet lengths are less than 500 ms. In one embodiment, the sniplet lengths are less than 200 ms. In one embodiment, the sniplet lengths are less than 150 ms. In one embodiment, the sniplet lengths are less than 120 ms. In the specific examples described herein, the sniplet lengths are approximately 100 ms. In one embodiment, the snippet may be split into at least four sniplets (N=4). In one embodiment, the snippet may be split into at least six sniplets. In one embodiment, the snippet may be split into at least eight sniplets. The specific value of N may be dependent on the length of the snippet and chosen to create sniplets of a desired length.

In one specific embodiment, all dividable snippets (i.e., not silent nor periodic), regardless of overall duration, are split into 8 equal sniplets. So, for example, a 520 ms (0.52 s) prompt snippet is split into 8 sniplets of 65 ms. Similarly, a snippet of 996 ms (0.996 s) is split into 8 equal sniplets of 124.5 ms.

Important properties of each sniplet include, without limitation, the snippet it came from, and the time offset of that sniplet relative to the start of the original snippet. Other properties may be apparent to the person skilled in the art. These properties, which may uniquely identify a sniplet, can be embedded into a naming convention for the sniplet that enables the properties of a sniplet to be readily identified, both by a human analyst, or when automatically parsing the sniplet. In one embodiment, each sniplet can be named with a snippetname_TimeOffset pattern, where snippetname is the name of the snippet from which the sniplet is derived, and TimeOffset is the offset in milliseconds from the start time of the original snippet. As an example, an 800 ms snippet called Greet2 can be split into 8 sniplets as shown in the following table:

| Greet2 | |
| --- | --- |
| Sniplet Name | Offset (ms) |
| Greet2_000 | 0 |
| Greet2_100 | 100 |
| Greet2_200 | 200 |
| Greet2_300 | 300 |
| Greet2_400 | 400 |
| Greet2_500 | 500 |
| Greet2_600 | 600 |
| Greet2_700 | 700 |
| Snippet duration | 800 |
| Short Snippet ? | No |

In this example, Greet2_300 is created from the Greet2 snippet and is the fourth sniplet in the Greet2 sniplet sequence. Greet2_300 contains the 100 ms of audio that starts at 300 ms into the snippet.

For the current call 406, the pdetect matched filtering process for subdivided snippets can be executed by comparing the call waveform 406 against all of the sniplets in the sniplet database 412, rather than the longer snippets. The pdetect sniplet results can then undergo an additional time-tolerant detection process 414 in which the new sniplet pdetect results are read line by line and the output parsed separately for each snippet by applying a number of constraints. Any sniplet results that do not meet the criteria as will be discussed below will be removed from consideration. Prompt detections that pass the TTD process 414 are combined with the prompt detections for the special snippets 408 into a combined prompt detection result 416.

The sniplet-based pdetect process identifies the presence of sniplets within the call waveform. It is an objective of the time-tolerant process to then determine whether a sniplet identified as being present within a call waveform correlates to the snippet also being present in the waveform and thus the prompt associated with the snippet being present in the waveform. Ideally, all sniplets of the snippet would be detected, all sniplets of the snippet would be detected in the correct sequence, and all sniplets of the snippet would be detected at the correct timestamps. However, the TTD process allows some variations in the number, duration, and timestamps of the detected sniplets to determine whether a snippet is present, thus allowing accurate prompt detection even on transmissions having significant error rates.

Figure 5:
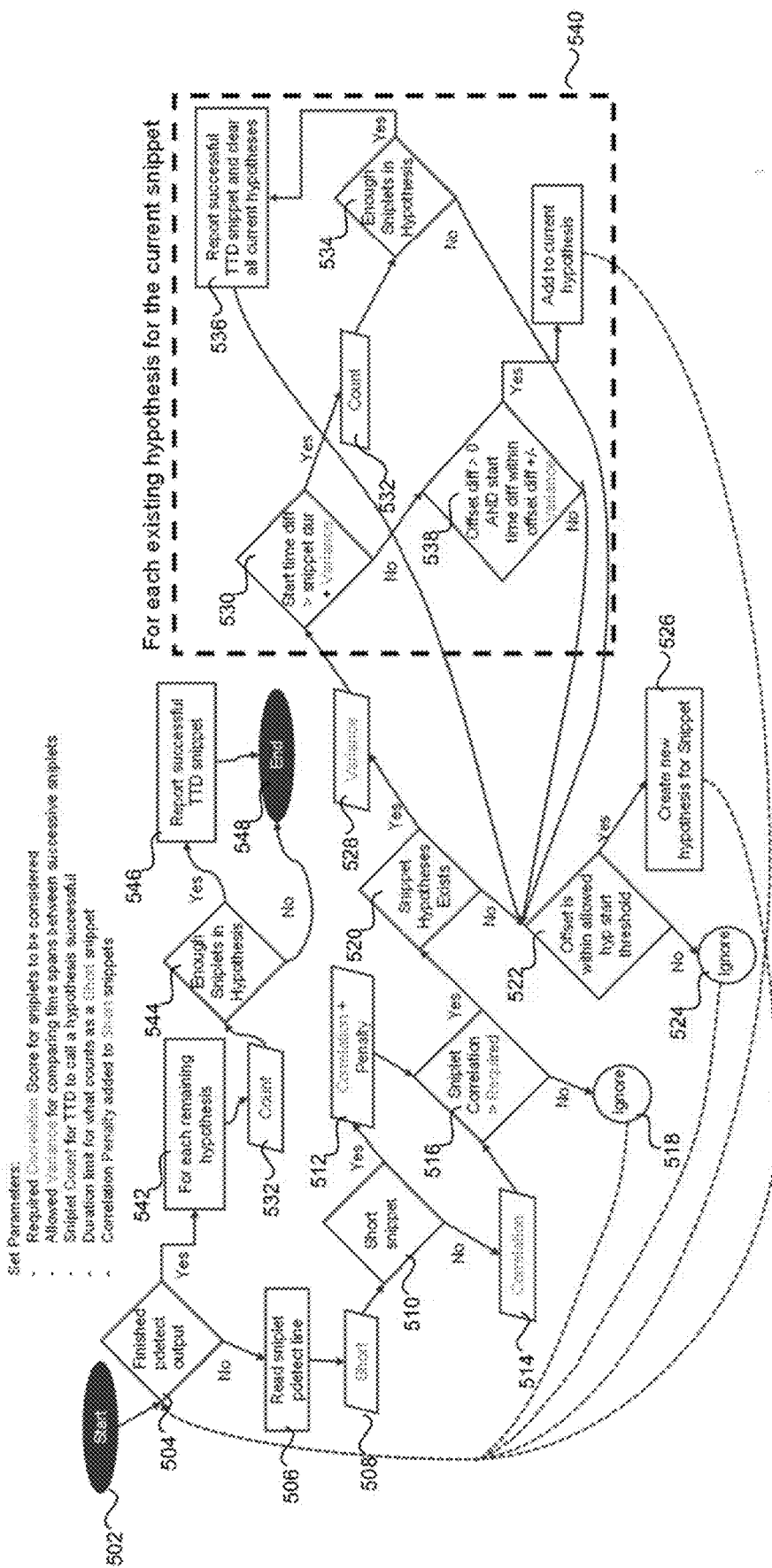
FIG. 5 shows a time toleration process for processing sniplets located in a call waveform.

An example method for the TTD analysis is shown in the process flow 500 of FIG. 5. In one embodiment, determining whether a set of sniplets correlate to a single snippet within the call waveform is governed by a set of constraint variables. In a specific example, there may be 5 constraint variables that control the TTD algorithm. By testing on different domains and types of prompts, variable defaults have been determined that are considered optimal, however, the person skilled in the art will readily understand that changes to these control variables remains within the scope of the present disclosure. Further, a greater or lesser number of constraint variables may be considered. In one embodiment, the constraint variables may be as follows:

A required correlation score for a sniplet to be considered (conf, default=0.7)

The allowed difference (variance) in start times between expected and detected sniplets, typically based on a comparison of successive sniplets (time(s.), default=0.03)

The number of sniplets required for a successful find (count, default=4)

The limit in seconds for what counts as a short snippet (short, default=0.55)

The addition to correlation score conf required for short snippets (splus, default=0.1)

In addition to these constraints, when reviewing for possible TTD hits, each sniplet is parsed for both offset and snippet name. Each specific named snippet is run in separate "threads" or lists so that a sniplet will never be compared against another sniplet that comes from a differently named snippet.

The flowchart 500 of FIG. 5 will be discussed with reference to a specific example illustrated as a call browser interface 600 in FIG. 6. The call browser interface displays an output of the pdetect process. The top window 610 shows the time-based waveform 612 that was analyzed. The lower window 620 shows the pdetect output presented as a list 622 of detected sniplets, their corresponding timestamps 624 and their associated correlation scores (conf) 626. The waveform 612 identifies the sniplets as events 614 on the waveform. In the current example, several sniplets of the Greet2 snippet have been detected. For example, the sniplet Greet2_400 636 has been detected with a timestamp of 0:04.203 with a conf score of 0.958. Event 636 is indicated on the waveform 612 as event 616.

The sniplet events detected during the pdetect process are processed against the TTD method to determine whether the events detected do, in fact, relate to the presence of the Greet2 snippet in the waveform.

The TTD process 500 starts at 502 by receiving the sniplet based pdetect output. At 504, the method determines whether any more pdetect output remains to be read. If so, the next line (pdetect sniplet detection event) is read from the pdetect output 506 (e.g., the Greet2_100 sniplet 630 in FIG. 6). At step 510, the process determines if the sniplet belongs to a short snippet, defined by the short variable 508 and if so, applies the short penalty (splus) to the correlation factor conf (step 512). Short snippets (any with a duration <=short seconds, default=0.55 s) require a correlation score that is at least as high as the provided conf+splus (by default 0.7+0.1) to prevent false accepts caused by very short snippets. If the sniplet does not pertain to a short snippet, then the conf value remains unchanged 514. Next, the method determines whether the conf value for the detected sniplet is higher than the required correlation factor 516. In general, the sniplet conf values are higher than those required when the pdetect process is applied to whole snippets, and higher again for sniplets belonging to short snippets. If the waveform does not have a sufficient correlation to the sniplet, as determined by the conf value, then the pdetect event is ignored 518 and the process returns to step 504. Otherwise (in the present example, Greet2_100 630 was detected with a conf=0.870), the process continues to step 520 where the process determines if there is a current snippet hypothesis in play. A snippet hypothesis is a subset of sniplets that may potentially indicate the presence of a snippet, if all the constraints and conditions are met, including that all member sniplets have the same snippet name. If no current hypothesis exists, and because the pdetect result indicates that the call waveform has been found to match the sniplet, then a new snippet hypothesis could potentially be created.

The pdetect output is a chronological sequence of sniplet detection events. Thus, by processing the output line by line, the first encountered pdetect event for a new hypothesis will be the earliest detected sniplet of that snippet. Ideally, for a perfect waveform, this would be the first 100 ms of a snippet. However, if the waveform is distorted or elements are missing, then the first detected sniplet may be a later sniplet, as in the present example where Greet2_000 was not detected. In order for snippet detection to be successful, the algorithm requires a minimum threshold number of sniplets to be detected (count; default=4). Thus, the system performs a check 522 that requires that any sniplet that begins a hypothesis have a starting offset from the beginning section of the snippet of less than or equal to (snippet duration−(sniplet length*count)). The offset for a sniplet identified in the pdetect output may be extracted from the pdetect output from the label listed in the pdetect output file, or by a lookup of the sniplet identity. By default, for an 800 ms snippet the maximum starting offset would need to be <=(800−(100*4)), i.e. <=400 ms. If the pdetect event does not pass the starting offset check 522, then the pdetect event is ignored 524 and the process returns to step 504 for continued processing of the pdetect output. If the check 522 passes (Greet2_100 offset=100 ms), then a new snippet hypothesis is created and stored 526. The snippet hypothesis will store the potential snippet and the offset of the starting sniplet detected. The process then returns to step 504 to continue processing pdetect output.

Assuming the next pdetect event (e.g., Greet2_200 632) that is processed by the TTD algorithm reaches step 520, the determination at step 520 will be that a snippet hypothesis exists and thus the process will proceed to step 530 to apply the time or variance variable 528 to determine whether the start time of the current sniplet is within allowable timeframes. The sniplet name may also be parsed at this stage to ensure that a sniplet cannot be added to a differently named snippet hypothesis. For example, if the pdetect event 632 was named Goodbye3_200, it could not be added to the Greet2 hypothesis even if the time and variance constraints were satisfied.

Step 530 determines whether the difference in the start times of the last sniplet in the hypothesis and the current sniplet, is greater than the duration of the hypothesized snippet plus the variance. If so, then the current sniplet cannot belong to the currently hypothesized snippet. Therefore, when a sniplet is found with a start time that is at least the length of the full prompt snippet plus the variance later than the start time of the last sniplet of the current hypothesis (step 530), the number of sniplets in the current hypothesis is compared (step 534) against the set number of sniplets 532 required to mark a successful find and the current snippet hypothesis to be valid. If the count (default 4 sniplets) is reached, the algorithm reports 536 that the snippet has been found at the specified point (i.e., the actual or implied start of the earliest sniplet of the snippet) and all current hypotheses for the named snippet are cleared. The sniplet under current consideration can then be treated as if no current hypothesis exists and thus can be processed under step 522 described above.

If the determination step 530 shows that the start time of the current sniplet allows for the current sniplet to potentially be within the current hypothesis, then the process determines 538 whether the difference in start times (timestamps) between the current sniplet and previous sniplet of the hypothesis is within the offset difference +/−the variance (default 0.03 seconds). Included in the comparison check of whether the difference in start times is within the allowable threshold of offset time differences is a check for whether the difference in offset times (current offset−previous offset) is greater than zero. If the offset difference is <=0, the current sniplet is not added to the hypothesis. This ensures that the process will only consider subsequent sniplets that occur in the correct sequence. The sniplet offsets need to be in an increasing sequence. In the current example, the previously found sniplet has an offset start of 100 and therefore any additional sniplets for consideration must have an offset start of 200 or higher.

Figure 6:
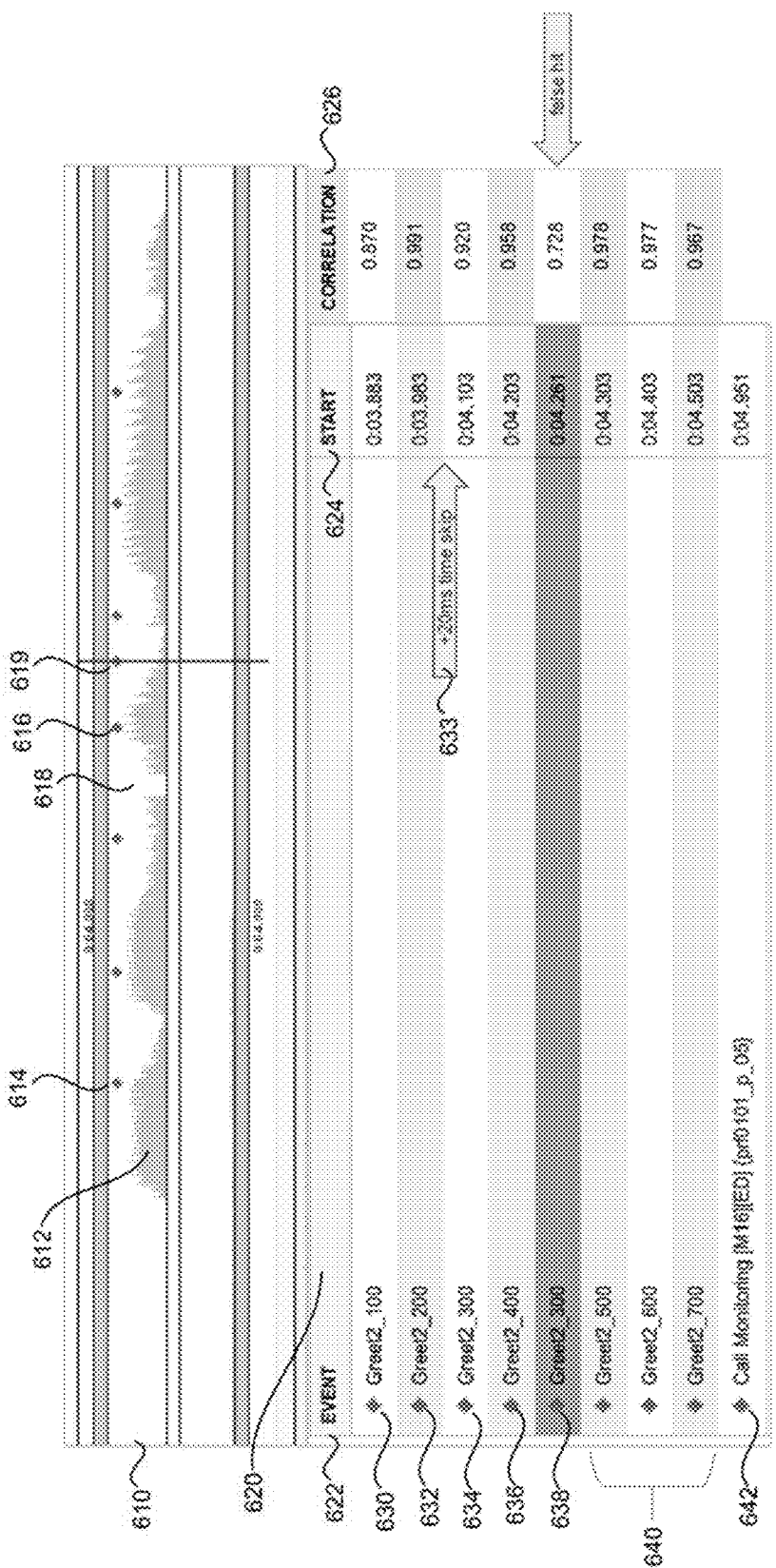
FIG. 6 shows an example data set on a call browser interface.

Referring to the example of FIG. 6, Greet2_100 starts at 3.883, the next sniplet for consideration is Greet2_200 starting at 3.983. In this case, the difference in start times is 3.983−3.883=0.100, while the difference in offset time is 0.2−0.1=0.1. With a time (variance) threshold of 0.03, the start time difference is in the allowable range: (0.1−0.03)=0.07<=0.100<=0.13=(0.1+0.03).

If the check 538 shows the current sniplet is correctly sequenced, then the sniplet is added to the current hypothesis and the process returns to step 504 for continued processing of the pdetect output. The Greet2_300 and Greet2_400 events 634, 636 of FIG. 6 would undergo the same process as the Greet2_200, thereby increasing the hypothesis count to four.

The pdetect output 622 includes a second detection of the Greet2_300 sniplet 638 with a timestamp=0:04.261. This event will reach step 538 but fail at this point because the offset difference between sniplet 638 and the latest sniplet in the current hypothesis 636 is 300−400=−100, which is less than zero. Additionally, the start time difference (0:04.262−0:04.203=0.058) is not within the acceptable offset difference (300−400=−100 ms)+/−variance. This event 638 could, however, be the first sniplet of a new snippet hypothesis (multiple hypotheses are discussed in more detail below) and thus the event 638 undergoes the check for allowable start offsets 522 which will start a new hypothesis.

The Greet2_500, Greet2_600 and Greet2_700 events 640 would each individually undergo the TTD process 500 and be added to the first hypothesis, increasing the hypothesis count to seven. They would each fail the check 538 of the second hypothesis pertaining to event 638.

Event 642 has a different snippet name/label, so it would not be checked against a hypothesis for the previous Greet2 sniplets. It also has a timestamp 0:04.951 that places it outside of the duration of the Greet2 snippet hypothesis, so it would be checked at step 522 to determine if it could be the first sniplet of a new hypothesis. The Greet2 hypothesis will remain frozen until either another Greet2 sniplet is detected and the previous hypothesis is pushed out via steps 530, 534, and 536; or until step 504 reaches the end of pdetect output and pushes out the Greet2 hypothesis via steps 542, 544, and 546.

As noted previously, the TTD algorithm allows for holding multiple hypotheses at once, to avoid situations where multiple possible start points are found within the same time frame. Thus, if the check 538 does not show the current sniplet to belong to the current hypothesis, it may be considered under step 522 as the initial sniplet of a new hypothesis. To demonstrate the need for allowing multiple hypothesis, a set of pdetect events may be tabled as follows:

| Event | Offset | Start Time |
| --- | --- | --- |
| Sniplet_1 | 100 | 114.539 |
| Sniplet_2 | 0 | 115.093 |
| Sniplet_3 | 100 | 115.193 |
| Sniplet_4 | 200 | 115.292 |
| Sniplet_5 | 300 | 115.392 |

In this example, without multiple possible hypotheses, the TTD algorithm would not find a result because the initial 100 offset sniplet listed (Sniplet 1) starts a hypothesis at 114.539 that does not match later found sniplets by offset times or start times. The next detected sniplet (Sniplet_2) has a difference of 0.554 seconds in start time relative to Sniplet 1, which is still within the allowed time threshold (0.8 seconds plus variance) to continue checking for the first sniplet. Without the ability to start a new hypothesis within the range of the first, there would be no restart or new hypothesis with the actual first 0 offset sniplet at 115.093 (Sniplet_2).

The process therefore allows multiple concurrent hypotheses to be generated with steps 530-538 bounded by box 540 in FIG. 5 being repeated for each currently existing hypothesis.

Returning to the initial step 504, if after processing a sniplet and returning to the pdetect output, there are no further pdetect events to process, the algorithm processes any remaining hypothesis as described above, by determining, for each remaining hypothesis 542, whether the hypothesis satisfies the threshold count 532 of sniplets for the hypothesis to represent a valid snippet detection 544. Valid snippet detections are reported 546 and the process ends 548.

Any snippet detections determined by the time-tolerant process 500 may be combined with the classic pdetect results, e.g., at step 416 of the process 400 of FIG. 4.

With reference again to the example of FIG. 6, the advantages of the time-tolerant detection process become apparent. The time gap between successive sniplets Greet2_200 632 and Greet2_300 634 is 120 ms, instead of the expected 100 ms. Using a conventional pdetect process on a full snippet, this 20 ms time skip 633, observable as a gap 618 in the waveform 612, may have been significant enough to distort waveform correlation sufficient to prevent snippet detection. However, under the time-tolerant detection process, the individual sniplets are accurately detected and the variance of the start times (20 ms) is within the allowed variance (default=30 ms) of the TTD process. Thus, the TTD process can detect snippets in cases where the ordinary pdetect method fails.

In the embodiments described herein, the default variance is 0.3 ms. Variations of this value will be apparent to the person skilled in the art. The variance value chosen may depend on system factors such as likely dropouts, packet errors, etc. For example, experiments on current data have shown 20 ms transmission errors to be common. If the allowed variance was less than 20 ms, then the TTD algorithm would still fail under common network conditions. By setting the variance above the 20 ms level, such transmission errors can be accounted for by the TTD process. The person skilled in the art would understand that while a variance of 30 ms is described herein, the variance can be adjusted to suit network conditions, e.g., if experiments detected common errors at a higher or lower duration.

The test dataset of FIG. 6, which was designed to display individual sniplet detections in a call browser interface, demonstrates that the TTD process is strong enough to tolerate spurious sniplet detections and false hits, which may be caused by the shorter sniplet length relative to full snippets. The false hit created by the sniplet event 638 does not result in a full snippet or prompt being erroneously reported, nor does the false hit distort the correct reporting of the snippet based on the initial snippet event 630.

As discussed previously, not all snippets are appropriate for the TTD process and thus some snippets will need to undergo the pdetect process on the entire snippet. Snippets that are mostly silence at the beginning or the end will not work with TTD because they cannot reach the required count of successfully found sniplets. Snippets that are mostly periodic (e.g., a ring or touch-tone), when divided into sniplets, produce difficulties in TTD algorithm because the different sniplets produce poorly defined detection times. A snippet can be analyzed for periodicity by reversing the snippet (e.g., using sox $WAV reverse_$wav reverse or simply reversing the order of samples in memory) and then running pdetect using the reversed audio as the snippet and the normal snippet audio as the "call". Only periodic snippets will have peaks that will be reported as hits.

Figure 7:
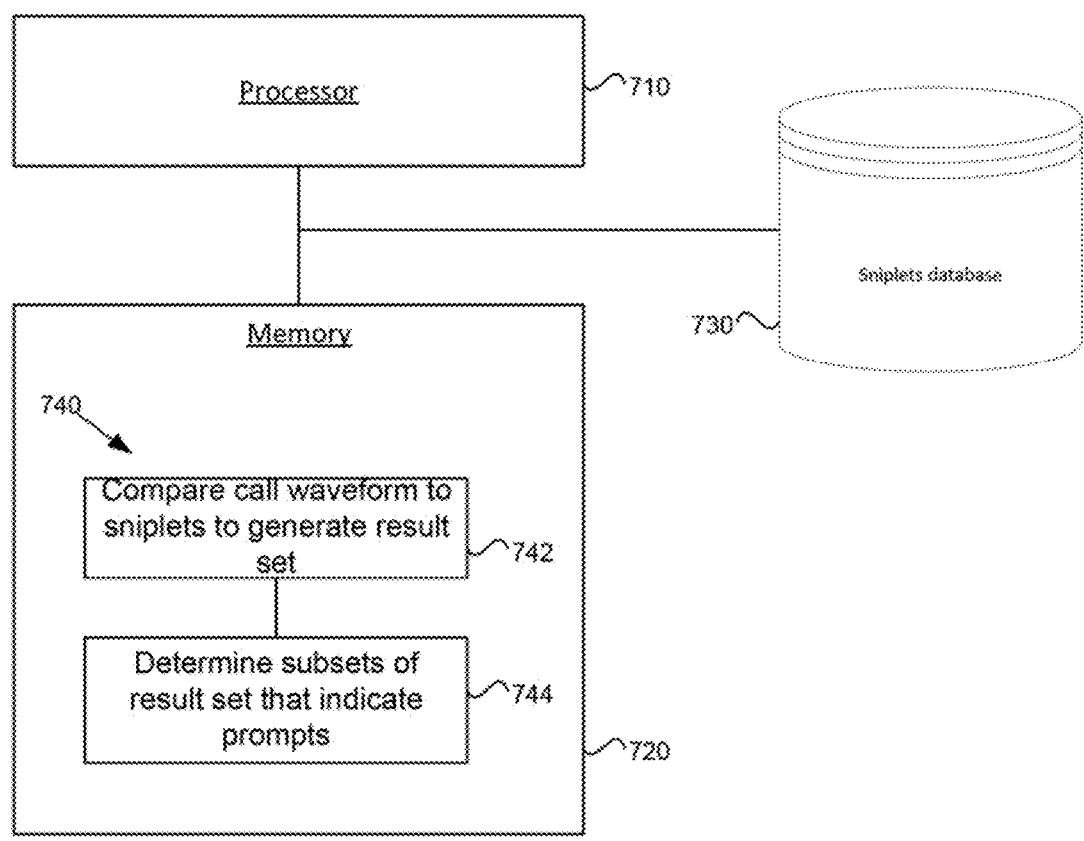
FIG. 7 shows a computing system on which a method of the present disclosure may be executed.

FIG. 7 schematically depicts a computing system 700 on which the call processing methods may be implemented. The system 700 may include at least one processor 710 operatively connected to at least one memory 720. The memory 720 may include read only memory for storing program instructions, code, data, results, etc. and randomaccess memory for executing program instructions, code, etc. The system 700 may also include a database 730 that stores data for use in the methods. For example, the database 730 may store snippets and sniplets. The database may also store recorded call waveforms for processing.

In one embodiment, the memory 720 may store instructions 740 that are executable by the processor 710. The instructions may include code for causing the processor to perform comparing the call waveform to a database of prompt waveform sniplets to generate a set of timestamped sniplets that indicates prompt waveform sniplets that were identified in the call waveform and where in the call waveform the respective prompt waveform sniplets were identified 742, and processing the set of timestamped sniplets to determine subsets of the timestamped sniplets that collectively indicate the presence of prompts in the call waveform 744.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method comprising:
processing a plurality of stored call waveform snippets to divide at least one stored call waveform snippet into a plurality of call waveform sniplets;
storing the plurality of call waveform sniplets;
processing a call waveform to detect a plurality of the stored call waveform sniplets within the call waveform; and
processing the detected call sniplets to determine if the detected call sniplets collectively represent one or more of the stored call waveform snippets,
wherein the call waveform snippet divided into the plurality of sniplets is based on if the call waveform snippet comprises at least one of an amount of silence greater than a threshold amount or a periodic waveform.

2. The method of claim 1 wherein processing the detected call sniplets comprises determining if a threshold number of call sniplets were detected within a threshold period of time.

3. The method of claim 2 wherein the threshold number represents at least half of the number of sniplets that a waveform snippet was divided into.

4. The method of claim 1 wherein processing the detected call sniplets comprises determining if a plurality of the call sniplets were detected in a correct sequence.

5. The method of claim 1 wherein processing the plurality of stored waveform snippets comprises determining if a call waveform snippet can be divided into a plurality of sniplets.

6. The method of claim 1 comprising processing the call waveform to detect any stored call waveform snippets that cannot be divided into sniplets.

7. The method of claim 6 comprising generating a report that identifies prompts identified in the call waveform, wherein the identified prompts comprise prompts represented by waveform snippets that were divided into waveform sniplets and prompts represented by waveform snippets that were not divided into waveform sniplets.

8. A system comprising:
at least one processor,
at least one memory operatively associated with the at least one processor; and
at least one database that stores call waveform snippets;
wherein the at least one processor is programmed to:
process a plurality of the stored call waveform snippets to divide at least one stored call waveform snippet into a plurality of call waveform sniplets;
store the plurality of call waveform sniplets in the database;
process a call waveform to detect a plurality of the stored call waveform sniplets within the call waveform; and
process the detected call sniplets to determine if the detected call sniplets collectively represent one or more of the stored call waveform snippets;
wherein the call waveform snippet divided into the plurality of sniplets is based on if the call waveform snippet comprises at least one of an amount of silence greater than a threshold amount or a periodic waveform.

9. The system of claim 8 wherein the at least one processor is programmed to determine if a threshold number of call sniplets were detected within a threshold period of time.

10. The system of claim 9 wherein the threshold number represents at least half of the number of sniplets that a waveform snippet was divided into.

11. The system of claim 8 wherein the at least one processor is programmed to determine if a plurality of the call sniplets were detected in a correct sequence.

12. The system of claim 8 wherein the at least one processor is programmed to determine if a call waveform snippet can be divided into a plurality of sniplets.

13. The system of claim 8 wherein the at least one processor is programmed to process the call waveform to detect any stored call waveform snippets that cannot be divided into sniplets.

14. The system of claim 13 wherein the at least one processor is programmed to generate a report that identifies prompts identified in the call waveform, wherein the identified prompts comprise prompts represented by waveform snippets that were divided into waveform sniplets and prompts represented by waveform snippets that were not divided into waveform sniplets.

15. A non-transitory computer readable medium comprising instructions, that when executed by a processor, cause the processor to perform identifying the presence of prompts in a call waveform comprising:
processing a plurality of stored call waveform snippets to divide at least one stored call waveform snippet into a plurality of call waveform sniplets;

storing the plurality of call waveform sniplets;

processing a call waveform to detect a plurality of the stored call waveform sniplets within the call waveform; and processing the detected call sniplets to determine if the detected call sniplets collectively represent one or more of the stored call waveform snippets, wherein the call waveform snippet divided into the plurality of sniplets is based on if the call waveform snippet comprises at least one of an amount of silence greater than a threshold amount or a periodic waveform.

16. The non-transitory computer readable medium of claim 15 comprising instructions that, when executed, cause the at least one processor to perform determining if a threshold number of call sniplets were detected within a threshold period of time.

17. The non-transitory computer readable medium of claim 15 comprising instructions that, when executed, cause the at least one processor to perform determining if a plurality of the call sniplets were detected in a correct sequence.

* * * * *